D. W. CROSLAND.
ROLLER BEARING.
APPLICATION FILED OCT. 2, 1915.
1,242,530.
Patented Oct. 9, 1917.
2 SHEETS—SHEET 2.
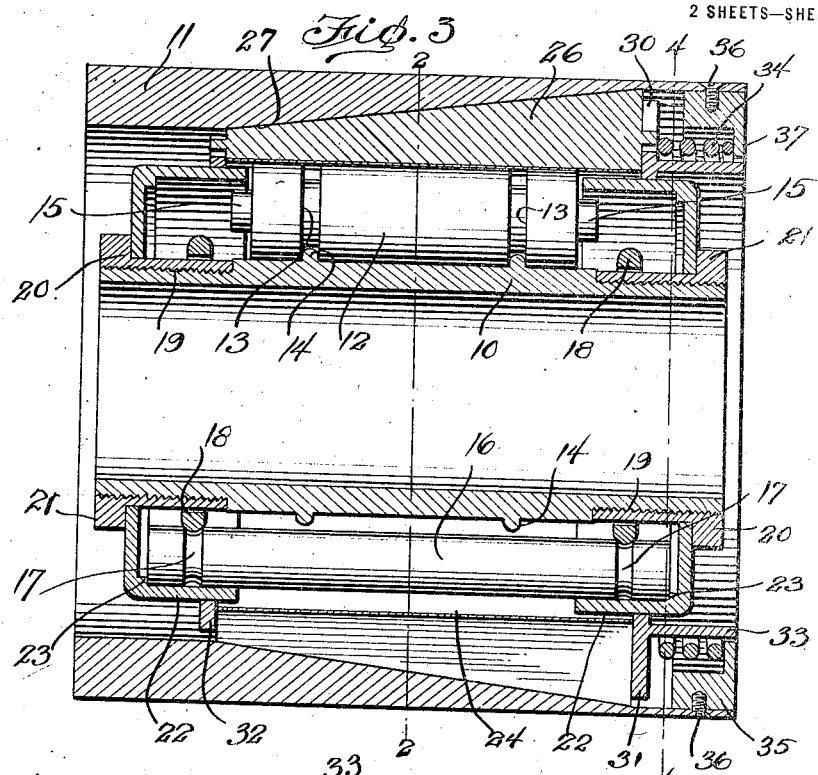
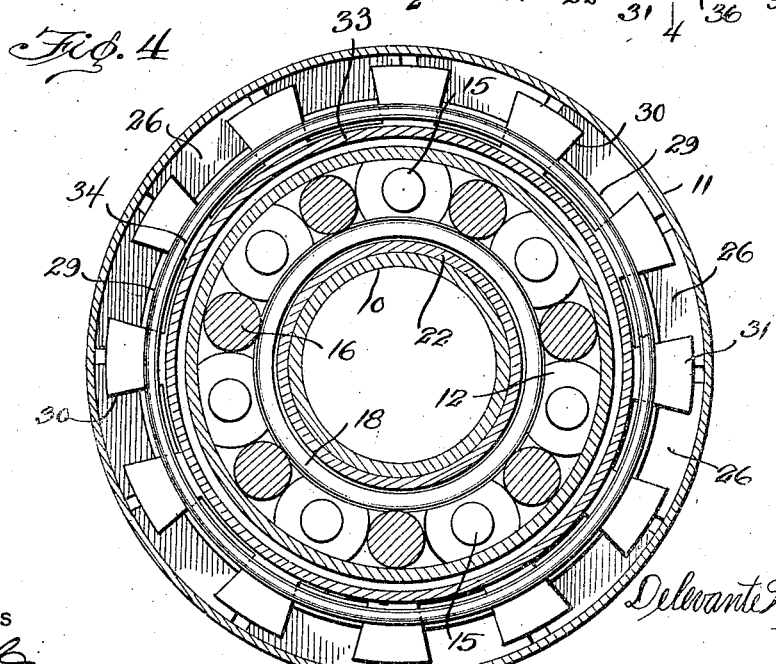
WITNESSES
INVENTOR
Delevante W. Crosland
BY
ATTORNEY

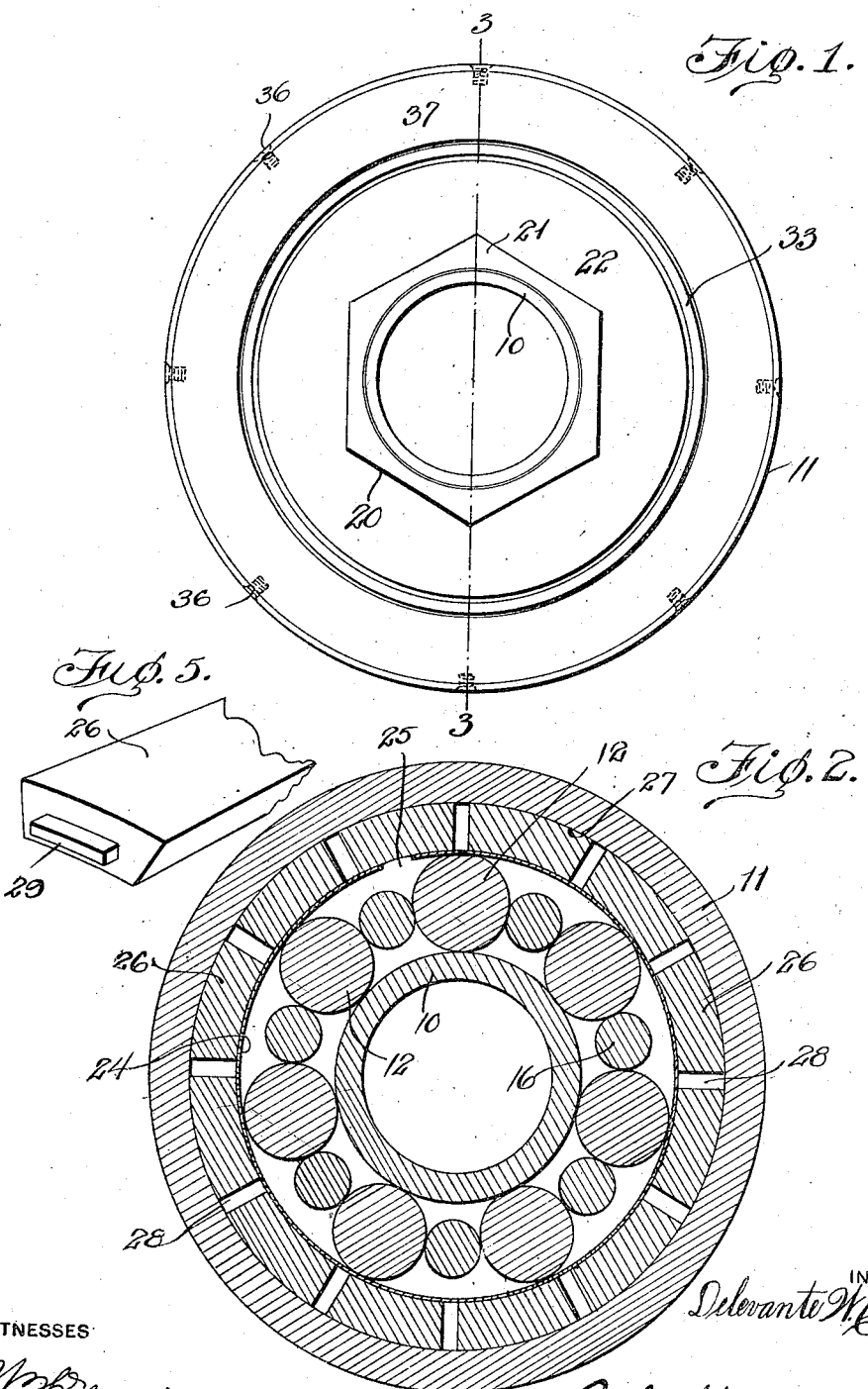

UNITED STATES PATENT OFFICE.

DELEVANTE W. CROSLAND, OF SAN FRANCISCO, CALIFORNIA.

ROLLER-BEARING.

1,242,530.

Specification of Letters Patent.

Patented Oct. 9, 1917.

Application filed October 2, 1915. Serial No. 53,738.

*To all whom it may concern:*

Be it known that I, DELEVANTE W. CROSLAND, a subject of the King of England, residing at San Francisco, in the county of San Francisco and State of California, have invented certain new and useful Improvements in Roller-Bearings, of which the following is a specification.

This invention relates to improvements in roller bearings for wheels, pulleys or the like revolving on an axle or horizontal shaft, also for any horizontal shaft, revolving in a bearing or box, and is therefore of universal adaptability, being applicable for traction haulage or power transmission.

As a principal object, it is contemplated by this invention to produce a roller bearing that shall be without sliding friction, so as to obviate the necessity of frequent lubrication.

A further object of the invention is to produce a roller bearing that shall include a housing capable of automatic adjustment to take up the wear of the rollers and of the bearing surfaces.

A more specific object of the invention is to provide a roller bearing having load bearing rollers which are incapable of longitudinal movement with respect to the contacting journal and to provide separating rollers between the main rollers which have no contact whatever with the journal.

The above and additional objects which will be hereinafter more specifically treated are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts:—

Figure 1 is an end view of the roller bearing of this invention, as completely assembled;

Fig. 2 is a transverse sectional view taken on some such plane as that indicated by the line 2—2 of the following figure;

Fig. 3 is a longitudinal sectional view taken on the line 3—3 of Fig. 1;

Fig. 4 is a view similar to Fig. 2 but taken on the line 4—4 of Fig. 3, and

Fig. 5 is a fragmentary perspective detail of one extremity of a take-up stave.

This invention consists chiefly of the novel combination and arrangement of parts thereof, whereby all the rollers are maintained in peripheral contact with one another, as it is of the greatest importance in the operation of the bearing that no slackness of the rollers should ever occur and that no one roller be able to revolve without causing every roller in the bearing to simultaneously revolve.

As illustrated in the sectional views, the rollers constituting the bearing as arranged between a journal 10 and a housing 11 are of two characters, alternately arranged. The main or load bearing rollers 12 have their rolling surfaces in direct contact with the journal 10 and are formed adjacent their extremities with circumferential grooves 13 which accommodate spaced ribs 14 annularly formed on the circumference of the journal 10. The projecting surface of these ribs is rounded to minimize friction therebetween and the grooves of the rollers 12, and form a means whereby longitudinal movement of the load bearing rollers with respect to the journal is obviated. Trunnions 15 are formed upon the extremities of the rollers 12 to prevent their displacement, in connection with other parts of the bearing whose relation will be later set forth.

Arranged in a circumferential series about the journal 10 in such manner as to alternate with the load bearing rollers 12, are a plurality of spacing rollers 16. These rollers have a diameter which is smaller than the diameter of the rollers 12, and are considerably elongated although similarly formed adjacent their extremities with grooves 17 which accommodate floating rings 18 loosely carried to encircle the journal 10 adjacent its extremities. The journal has its ends reduced and threaded as denoted by the numeral 19 for the reception thereon of a removable collar 20 which is formed with an annular shoulder 21 adapted to maintain upon the journal freely rotatable cup rings 22 which form a track or raceway for the spacing rollers 16. Small shoulders 23 are formed annularly in each cup ring adjacent its base for the purpose of preventing longitudinal sliding movement of the spacing rollers with respect to the journal.

It is to be particularly noted, as will be apparent from an inspection of Figs. 2 and 3, that the alternating series of load bearing and spacing rollers are such that each roller is maintained in contact with the two adjacent rollers, so that rotation of any one roller of the entire series must result in the simultaneous rotation of all of the rollers. The loose rings 18 which hold the spaced rollers upon the trackway provided by the rotary cups 22 also provide distribution of the friction of mounting these rollers over the largest possible space, since the rings and cups 22 are freely rotatable upon the journal 10.

A cylindrical wear-plate 24 is adapted to encircle the load bearing rollers and to be in contact with the rolling surfaces thereof at points diametrically opposite the journal 10, such lining plate being formed of a thin springy steel and having its extremities spaced obliquely as indicated by the numeral 25 in order to provide for take up of the wear of the roller surfaces, as it is essential that all of the rollers be mounted in contact with each other. Means for taking up this wear includes a plurality of staves or wedges 26 which are concaved upon their inner surfaces for contact with the ring 24 and adapted to the interior of a tapered bore 27 of the outer casing 11. The staves as arranged about the circumference of the ring 24 are preferably spaced as denoted by the numeral 28 in order to allow for lateral take up as they are adjusted to take up the wear plate space 25.

The take up staves are adapted to be longitudinally adjusted by automatic means which insures proper contact between the plate 24 and the rollers 12 at all times. The extremities of each wedge are formed with a reduced extension 29 which are adapted to seat in the serrations 30 radially formed at the circumference of rings 31 and 32 adapted to inclose the staves. The serrated ring 31 surrounds, without contact, one of the cup rings 22 at the side of the roller bearing to which the larger ends of the staves are directed, a cup flange 33 being laterally formed on this ring. Coiled around this lateral flange 33 is an expansible spring 34 which is adapted to act against the periphery of the serrated disk 31. A retaining collar 35 has its annular portion secured by removable means 36 to the circumferential walls of the housing 11 and is provided with a dependent flange 37 adapted to engage the spring 34 in order to confine such space therebetween and the disk 31.

From the description it is believed to be apparent that longitudinal movement of the staves 26 will be coincident with the serrated rings 31 and 32 and toward the smaller internal diameter of the tapered housing boring 27, which will cause the internal diameter of the circumferential series of staves to be reduced and which will, accordingly, contact the plate 24 directly with the load bearing rollers 12. In this way all wear will be taken up between both the rollers and the rolling surfaces, all of the rollers wearing in a similar manner owing to the arrangement whereby they must simultaneously rotate, and with the sliding friction of each roller reduced to the minimum by the same means.

While in the foregoing, however, there has thus been illustrated in the drawings and described in the specification such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claims.

What is claimed is:—

1. In a roller bearing, a journal having annular ribs centrally formed thereon, collars threaded on the extremities of the journals, cup rings maintained in position on the journal by said collars, load bearing rollers formed with grooves adapted to said journal ribs for maintaining them against endwise movement, said rollers contacting with the journal between the cup rings, spacing rollers alternating with said load bearing rollers and formed adjacent their extremities with annular grooves, said spacing rollers being longer than the load bearing rollers and having their ends rotatable in said cup rings as a traction-way, and rings freely rotatable upon the journal and adapted to the grooves in said spacing rollers.

2. In a roller bearing, a journal formed with reduced extremities and having ribs centrally formed thereon, collars threaded on the journal extremities, freely rotatable cup rings maintained by said collars, parallel load bearing rollers formed with annular grooves adapted to said journal ribs, parallel spacing rollers smaller in diameter and longer than the load bearing rollers with which they alternate, the extended ends of said spacing rollers mounted within said cup rings, said spacing rollers being formed with annular grooves adjacent their extremities, and floating rings adapted to said annular grooves.

3. In a roller bearing, a journal formed with threaded extremities and having ribs formed centrally thereon, collars secured upon said threaded extremities of the journal, rotatable cup rings maintained by said collars, load bearing rollers formed with grooves adapted to said journal ribs, spacing rollers alternating with said load bearing rollers and formed adjacent their extremities with annular grooves, said spacing rollers being rotatable within said cup rings as a track-way, and rings freely rotatable around said journal adapted to the grooves of said spacing rollers.

4. In a roller bearing, a journal with annular ribs between its ends, collars receivable on the journal extremities, freely rotatable cup rings maintained by said collars, load bearing rollers formed with reduced extremities extended within said cup rings, annular grooves formed in load bearing rollers adapted to said journal ribs, said rollers contacting with the journals between said cup rings, spacing rollers alternating with said load bearing rollers and formed adjacent their extremities with annular grooves, said spacing rollers projecting at their ends within said cup rings, and floating rings adapted to the annular grooves in said spacing rollers.

5. In a roller bearing, a journal formed with a pair of parallel annular ribs, a collar on each end of said journal having an outwardly extending flange, a cup ring freely rotatable on said collar and maintained on the ends of the journal by the flange of the collar, a plurality of load bearing rollers each formed with annular grooves adapted to engage the ribs on the journal, rollers of greater length and smaller diameter equally spacing the load bearing rollers and projecting at their ends into said cup rings for guidance thereby, grooves on the ends of the spacing rollers, and floating rings encircling the journal adapted to the grooves in the spacing rollers.

6. In a roller bearing, a journal formed with reduced extremities and having ribs formed centrally thereon, collars receivable upon the extremities of the journal, rotary cup rings maintained by the collars each having an internal annular bearing shoulder, load bearing rollers formed with grooves adapted to said journal ribs, and spacing rollers alternating with said load bearing rollers and elongated to rotate in said cup rings as a trackway against said shoulders and out of contact with said journal.

7. In a roller bearing, a journal, formed with reduced extremities and having annular ribs centrally formed thereon, collars receivable on the journal extremities, rotary cup rings maintained by the collars, a narrow shoulder within each cup ring, load bearing rollers formed with grooves adapted to said journal ribs, and contacting with the journal between said cup rings, and spacing rollers elongated beyond said load bearing rollers to rotate at their ends in said cup rings as a trackway and against said shoulders to prevent endwise movement of the rollers.

8. In a roller bearing, a journal formed with reduced extremities and having annular ribs centrally formed thereon, collars receivable on the journal extremities, rotary cup rings maintained by the collars, a narrow annular shoulder within each cup ring, load bearing rollers formed with grooves adapted to said journal ribs, and contacting with the journal between said cup rings, spacing rollers alternating with said load bearing rollers and formed adjacent their extremities with annular grooves, said spacing rollers being rotatable in said cup rings as a trackway with their ends contacting said shoulders to prevent endwise movement of the rollers, and rings freely rotatable upon the journal and adapted to the grooves of said spacing rollers.

9. In a roller bearing, a journal, collars threaded on the extremities of said journal each having an outwardly radiating flange, rotary cup rings maintained on said collars by said flanges, load bearing rollers contacting with the journal between said cup rings and having reduced ends extending into said cup rings, spacing rollers alternating with said load bearing rollers and formed adjacent their extremities with annular grooves, said spacing rollers being rotatable in said cup rings, as a track-way, and float rings freely rotatable upon the journal and adapted to the grooves of said spacing rollers.

10. In a roller bearing, a journal, load bearing rollers in contact with said journal, spacing rollers between said load bearing rollers and of greater length, collars threaded on the ends of said journal each having a radiating flange, rotatable cup rings encircling and supporting the outer ends of said spacing rollers and maintained on the ends of the journals by said collars and their flanges, and float rings encircling said journal and contacting on their outer edges with said spacing rollers, said cup rings and float rings being independently movable around the journal.

11. In a roller bearing, a journal, collars threaded on the ends of said journal each collar having a radially extending flange, load bearing rollers in contact with said journal, spacing rollers of less diameter but of greater length than said load bearing rollers alternating therewith and in contact with the latter rollers, rotatable cup rings encircling and contacting with the outer surfaces of the extremities of said spacing rollers being maintained in position by said flanged collars on the ends of the journals, and floating rings encircling said journal and contacting with the inner surfaces of the spacing rollers near their ends, said cup rings and floating rings being independently rotatable around the journal.

12. In a roller bearing, a housing provided with a tapered interior bore, tapered staves lining the bore of said housing, rings longitudinally movable within the housing and formed with serrated peripheries, and extensions formed upon said staves for reception in the serrations of said rings.

13. In a roller bearing, a housing formed with a tapered interior bore, a plurality of tapered staves lining the boring of said housing, rings longitudinally movable with respect to said housing, one of said rings being formed with a cup flange, means connecting said staves to said rings, and resilient means receivable upon said cup flange for forcing said staves into said bore.

14. In a roller bearing, the combination of a journal, load bearing rollers in contact with the journal, means preventing longitudinal movement of the rollers with respect to the journal, spacing rollers alternating with said load bearing rollers, means forming a trackway for said spacing rollers out of contact with said journal, a wear lining surrounding said load bearing rollers, a housing for the bearing, staves mounted within the housing for contact with said lining, and resilient means automatically determining the pressure between said lining and said load bearing rollers.

In testimony whereof I affix my signature in presence of two witnesses.

DELEVANTE W. CROSLAND.

Witnesses:
  MERVYN R. DOWD,
  E. J. CASEY.